United States Patent [19]

Rakieski

[11] Patent Number: 5,592,965
[45] Date of Patent: Jan. 14, 1997

[54] VALVE STOP CHANGER

[75] Inventor: Kenneth E. Rakieski, Gifford, Pa.

[73] Assignee: Dresser Industries, Inc., Dallas, Tex.

[21] Appl. No.: 289,016

[22] Filed: Aug. 11, 1994

[51] Int. Cl.$^6$ ............................. F16L 55/12; F16K 43/00
[52] U.S. Cl. ............................. 137/315; 29/213.1; 138/89; 138/94; 138/97
[58] Field of Search ............................. 29/213.1, 221.6; 137/15, 315, 317, 318; 138/89, 90, 94, 97

[56] References Cited

U.S. PATENT DOCUMENTS

| | | | |
|---|---|---|---|
| 2,299,365 | 10/1942 | Valuch | 138/89 |
| 2,306,452 | 12/1942 | Lopez | 138/89 |
| 2,390,461 | 12/1945 | Racz | 138/89 |
| 2,462,748 | 2/1949 | Johnson | 138/89 |
| 2,690,612 | 10/1954 | Scott | 29/213.1 |
| 2,867,243 | 1/1959 | Bowan | 138/89 |
| 3,022,801 | 2/1962 | Petersen | 138/89 |
| 3,494,504 | 2/1970 | Jackson | 138/89 |
| 3,841,355 | 10/1974 | Laner | 138/89 |
| 3,993,103 | 11/1976 | Hammer | 138/89 |
| 4,239,055 | 12/1980 | Van Coffman | 138/94 |
| 4,303,102 | 12/1981 | Hugley | 138/89 |
| 4,349,047 | 9/1982 | Ditto et al. | 138/89 |
| 4,441,561 | 4/1984 | Garmong | 138/89 |
| 4,597,147 | 7/1986 | Henry | 29/213.1 |
| 4,790,356 | 12/1988 | Tash | 138/93 |
| 4,982,765 | 1/1991 | Klahn | 138/89 |
| 5,038,818 | 8/1991 | Jiles | 137/317 |
| 5,099,868 | 3/1992 | Weber | 137/15 |
| 5,152,311 | 10/1992 | McCreary | 138/89 |
| 5,168,902 | 12/1992 | Hood | 138/89 |
| 5,181,543 | 1/1993 | Hendzel | 138/90 |
| 5,363,881 | 11/1994 | Larkin | 138/89 |

FOREIGN PATENT DOCUMENTS

| | | | |
|---|---|---|---|
| 0940466 | 1/1974 | Canada | 138/89 |
| 1334210 | 10/1973 | United Kingdom | 138/89 |

*Primary Examiner*—George L. Walton
*Attorney, Agent, or Firm*—Richards, Medlock & Andrews

[57] ABSTRACT

A fluid valve can be disconnected from a fluid pressurized container by use of a changer tool having an elongated tubular housing, a tubular member positioned within and coaxial with the housing bore for slidable movement along the longitudinal axis, a shaft positioned within and coaxial with the bore of the tubular member for axial movement of the shaft with respect to the tubular member, a first retention member on one end of the shaft, a second retention member on one end of the tubular member, and an elastomeric tubular plug member positioned about the shaft between and in contact with the two retention members. Each of the two end portions of the elastomeric plug member is substantially harder than the intermediate portion of the elastomeric plug member, and is provided with an outwardly extending annular ring which engages an internal shoulder in the associated retention member to secure the retention member to the plug member.

19 Claims, 4 Drawing Sheets

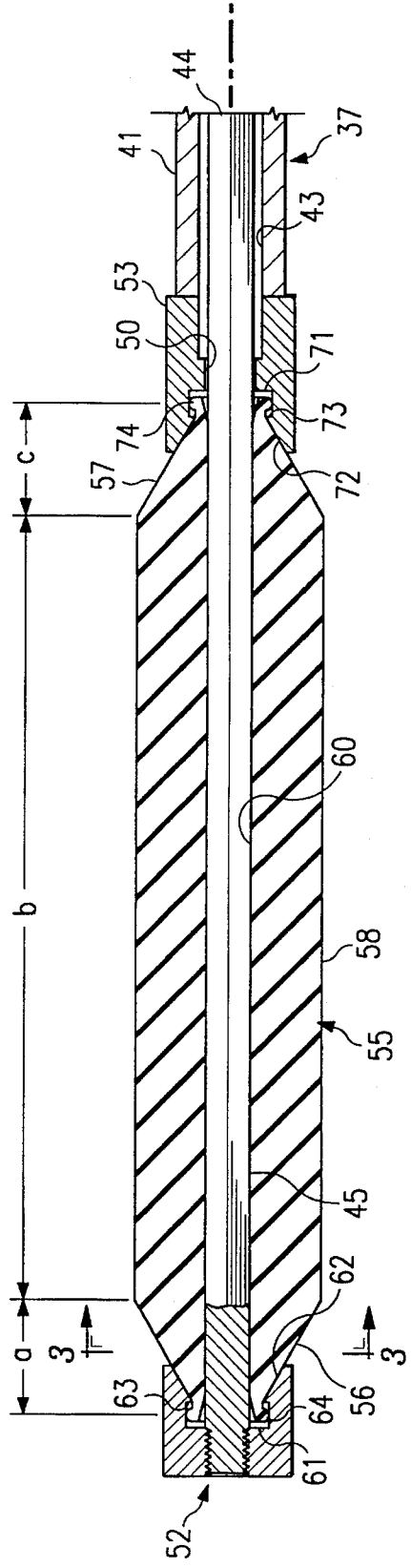
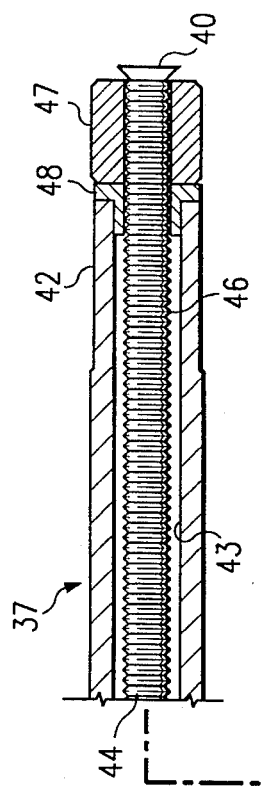
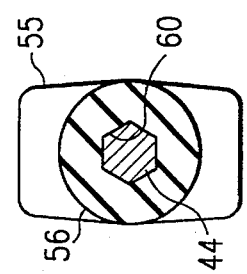
FIG. 2
FIG. 3

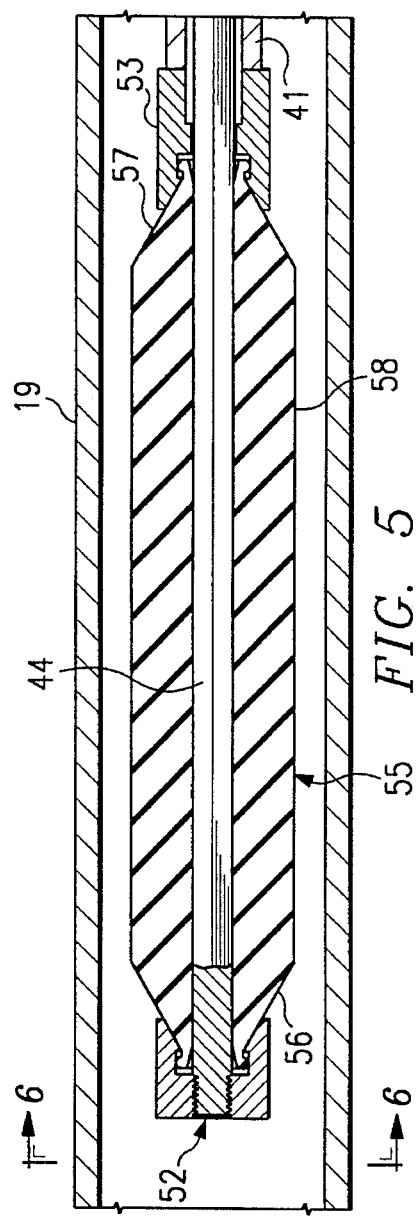
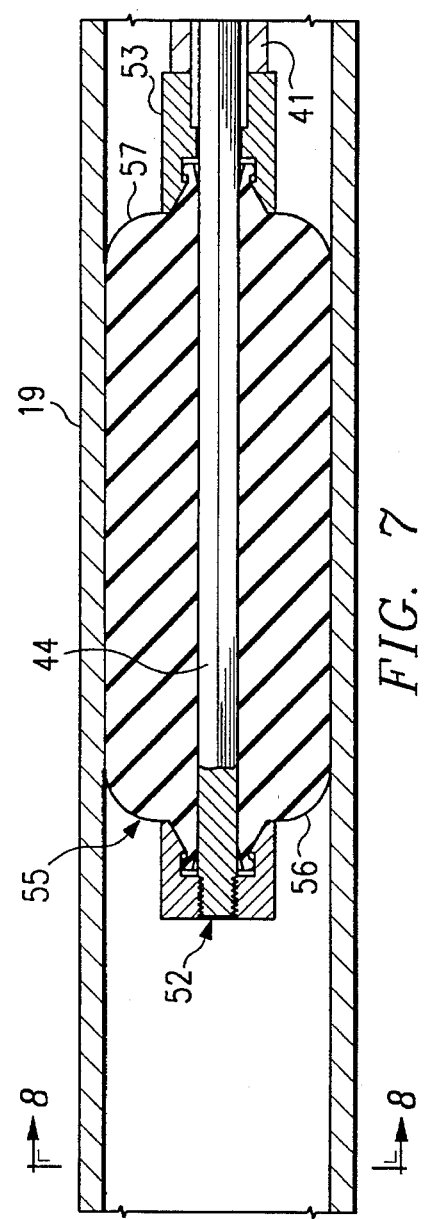
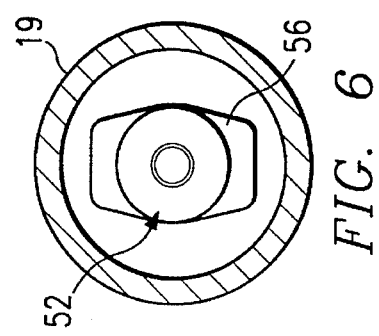
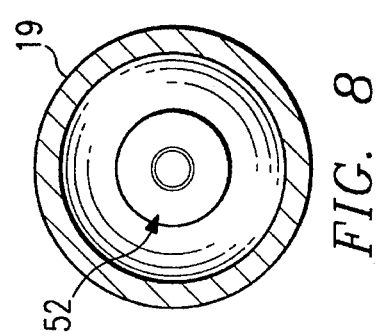

VALVE STOP CHANGER

FIELD OF THE INVENTION

The invention relates to the field of fluid valves. In a particular aspect the invention relates to a valve stop changer tool for removing a valve from a fluid pressurized line.

BACKGROUND OF THE INVENTION

Valve stop changer tools are utilized extensively with gas distribution lines where it becomes necessary to change out a line valve without depressurizing the upstream service line in which the valve is contained. A physical requirement of such changer tools is that they be able to seal off the pipe upstream of the valve through the use of a radially expandable plug which must first be passed through the valve ports from the downstream side of the valve. After the changer tool has been properly positioned and expanded for sealing engagement with the interior surface of the pipe upstream of the valve, the valve can be removed and replaced and/or repaired as necessary.

The changer tools are generally custom designed by a valve manufacturer to accommodate the port geometries of a particular model valve. Accordingly, such tools are generally unsuitable for use with different valves. Obviously, the person who is working with the valves in the field would prefer to have a valve stop changer tool which is operable with various model valves. One such versatile tool is disclosed by Ralph Henry in U.S. Pat. No. 4,597,147. The Henry tool employs an elastomeric plug positioned between a pair of restraining ends with each of the restraining ends comprising a plurality of contiguous elements which are laterally slidable so that the retaining ends are operable to axially confine the plug while squeezing and radially expanding the plug. The entire plug assembly is sufficiently small to enable passage through a variety of valve ports without regard to the port geometry, while the expansion ratio of the tool is sufficient to achieve the required seal in the upstream pipe to enable the removal of the valve. However, the Henry tool requires a large number of parts, which increases manufacturing expense.

Problems have also been encountered with prior changer tools which utilize an expandable plug in that after the plug has been axially compressed and radially expanded to form a seal and the valve has been removed and then replaced, the axial expansion of the compressed plug upon release of the axial compression forces is not as rapid as desired for prompt removal of the changer tool.

SUMMARY OF THE INVENTION

In a first aspect of the invention, a changer tool for removal of a fluid valve from connection with a fluid pressurized container comprises an elongated housing having a first bore extending axially therethrough, a tubular member positioned within and coaxial with the first bore for slidable movement of the tubular member along the axis of the first bore, the tubular member having a second bore extending axially therethrough, a shaft positioned within and coaxial with the second bore for movement of the shaft with respect to the tubular member, a first retention member on one end of the shaft, a second retention member on an adjacent end of the tubular member, an elastomeric tubular plug positioned about the shaft between and in contact with the first retention member and the second retention member, wherein each of the end portions of the elastomeric plug has a hardness which is substantially greater than the hardness of the intermediate portion of the elastomeric plug. In general, this difference in hardness will be at least 20, preferably at least 25, and more preferably at least 30 on the durometer Type A scale. In a preferred embodiment of this aspect of the invention, the hardness of each of the end portions of the elastomeric plug is approximately 80±5 durometer Type A while the hardness of the intermediate portion of the elastomeric plug is approximately 40±5 durometer Type A.

In another aspect of the invention, each of the end portions of the elastomeric plug is secured to the associated retention member so that the plug is placed under tension when the distance between the retention members is increased. Each of the retention members can have an inner annular chamber and an outer annular chamber formed therein coaxially with the shaft and extending radially outwardly from the shaft, with the outer annular chamber of each retention member being positioned between and extending from the inner annular chamber of that retention member to the end of that retention member facing the elastomeric plug. The radial dimensions of each inner annular chamber are greater than the corresponding radial dimensions of the adjacent portion of the outer annular chamber so as to form an annular shoulder at the junction of the inner and outer annular chambers of a given retention member. Each end portion of the elastomeric plug extends axially through the outer annular chamber into the inner annular chamber of the associated retention member and has a radially outwardly extending retention element positioned in the inner annular chamber in engagement with the annular shoulder to securely fix the elastomeric plug to the respective retention member. In a preferred embodiment of this aspect of the invention, each of the outer annular chambers and the end portions of the elastomeric plug have mating frustoconical surfaces, and each retention element is an annular ring which extends completely around the outer circumference of the end portion of the elastomeric plug to form a gas seal to prevent gas leakage between the retention member and the elastomeric plug.

It is an object of the present invention to provide an improved valve stop changer tool for removal of valves in service and under pressure. It is an object of the present invention to provide an improved valve stop changer tool which can be employed with valves of different manufacturers having different port opening geometries. Another object of the present invention is to provide a valve stop changer tool which requires fewer parts and has a simpler construction. Another object of the present invention is to provide a valve stop changer tool having increased structural strength. Yet another object of the present invention is to provide a valve stop changer tool which can be mounted by hand rather than requiring the use of a wrench. It is an object of the present invention to provide an improved valve stop changer tool wherein the expandable plug can be rapidly returned from its expanded state to its normal state to thereby facilitate quick removal of the tool through the repaired or replaced valve. Other objects, aspects, and advantages of the invention will be apparent from drawings and the description of the invention.

BRIEF DESCRIPTION OF THE DRAWINGS

FIG. 2 is an elevational view, partly in cross-section along the longitudinal axis, of the stop changer assembly of FIG. 1 in its initial state;

FIG. 3 is a cross-sectional view taken along line 3—3 in FIG. 2;

FIG. 5 is an elevational view, partly in cross-section along the longitudinal axis, of the stop changer assembly of FIG. 1 in the upstream pipe before compression thereof;

FIG. 6 is a cross-sectional view taken along line 6—6 in FIG. 5;

FIG. 7 is an elevational view, partly in cross-section along the longitudinal axis, of the stop changer assembly of FIG. 1 in the upstream pipe after axial compression thereof; and FIG. 8 is a cross-sectional view taken along line 8—8 in FIG. 7.

DETAILED DESCRIPTION

Figure 1:
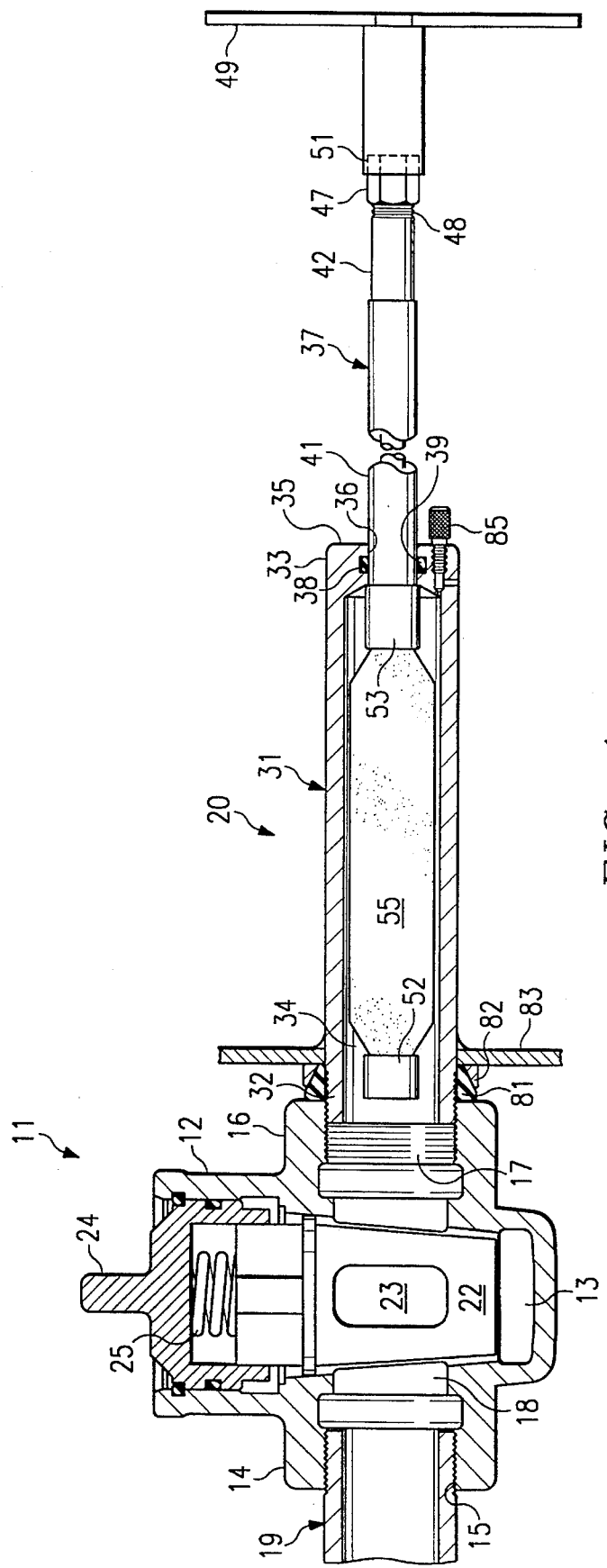
FIG. 1 is an elevational view, partly in cross-section, of a valve stop changer tool mounted on a valve with which it is to be utilized with the stop changer assembly being in its initial position.

Referring now to FIG. 1, the plug valve 11 has a valve body 12 forming a generally frustoconical plug chamber 13, a first fitting end portion 14 having a fluid opening 15, and a second fitting end portion 16 having a fluid opening 17. The fluid openings 15 and 17 constitute a fluid inlet and a fluid outlet which are at least generally aligned with each other, with a fluid passageway 18 extending in a generally straight line from one of fluid openings 15 and 17 through the plug chamber 13 to the other of the fluid openings 15 and 17. One end portion of passageway 18 has internal threads for connection of the valve 11 to a gas service pipe 19, while the other end portion of passageway 18 has internal threads for connection of the valve 11 to the valve stop changer tool 20. A generally frustoconical plug 22 is positioned in plug chamber 13 and is provided with a generally rectangular fluid passageway 23 therethrough. A valve stem 24 engages the plug 22 for effecting rotation about the vertical (as shown in FIG. 1) axis of the plug 22. A spring 25 in the valve stem 24 biases the plug 22 toward the bottom of the plug chamber 13. In a closed position of the plug 22, illustrated in FIG. 1, the longitudinal axis of the fluid passageway 23 of plug 22 is positioned approximately 90° to the longitudinal axis of the fluid passageway 18 in valve body 12, such that the plug 22 blocks the fluid passageway 18. In an opened position of the plug 22, illustrated in FIG. 4, the longitudinal axis of the fluid passageway 23 of plug 22 at least generally coincides with the longitudinal axis of the fluid passageway 18 in valve body 12 so that there is a clear passageway from opening 15 to opening 17.

The stop changer tool 20 comprises an elongated cylindrical annular housing 31 having a first end portion 32 and a second end portion 33, with a cylindrical bore 34 extending axially therethrough. The first end portion 32 is provided with external threads for mating with the internal threads in the opening 17 of valve 11. The second end portion 33 is provided with an inwardly directed flange 35 forming a short, axially extending cylindrical bore 36 coaxial with, but of reduced diameter compared to, the main bore 34. A cylindrical tubular member 37 is positioned within and coaxial with bores 34 and 36 for slidable movement of the tubular member 37 along the axis of bores 34 and 36. The bore forming surface of flange 35 is provided with an annular slot 38, in which an O-ring 39 is positioned so as to provide a gas seal between flange 35 of housing 31 and the tubular member 37. The tubular member 37 has a first end 41, which is positioned within the housing 31, and a second end 42, which is positioned outside of the housing 31.

As shown in FIG. 2, a cylindrical bore 43 extends axially through tubular member 37 from the first end 41 to the second end 42. A shaft 44 is positioned within and coaxial with the bore 43 for reciprocating movement of the shaft 44 with respect to the tubular member 37. The shaft 44 has a first end portion 45 and a second end portion 46, with the outer end of the second end portion 46 extending outwardly beyond the outer end 42 of tubular member 37. The second end portion 46 of the shaft 44 is cylindrical and is provided with external threads for engagement by an operating nut 47 which is located on the part of the second end portion 46 which extends beyond tubular member 37. A thrust bushing 48 is positioned coaxially about shaft 44 between the nut 47 and the outer end of the tubular member 37, while the outer end of the shaft 44 is provided with a flat head screw 40 for preventing the removal of the nut 47 from shaft 44. The thrust bushing 48 can have an annular sleeve portion which extends coaxially with the shaft 44 inside of the tubular member 37 to center the shaft 44 in the tubular member 37 and to minimize friction when the shaft 44 is being moved axially with respect to tubular member 37 by the rotation of nut 47. A removable operating handle 49 is provided with a driving socket end 51 for engaging the nut 47 in order to provide axial movement of the tubular member 37 with respect to the housing 31, as well as to rotate the nut 47, thus causing relative axial motion of the shaft 44 with respect to the nut 47.

Referring now to FIG. 2, a first retention member 52 is positioned on the distal end of the first end portion 45 of the shaft 44. A second retention member 53 is positioned on the adjacent first end 41 of the tubular member 37. The retention member 52 can be integrally formed with shaft 44, or it can be formed separately and then secured to the first end portion 45 of shaft 44 by any suitable means, e.g. by threaded engagement followed by soldering. Similarly, the retention member 53 can be integrally formed with tubular member 37, or it can be formed separately and then secured to the first end 41 of the tubular member 37 by any suitable means, e.g. by soldering. The first end portion 45 of shaft 44 has a hexagonal cross-section in a plane perpendicular to the longitudinal axis of the shaft 44, as shown in FIG. 3. Retention member 53 has a bore section 50 which has a hexagonal cross-section corresponding in size and shape to the first end portion 45 of shaft 44 so that the shaft 44 is engaged by retention member 53 and prevented from rotating with respect to tubular member 37.

An elastomeric tubular plug member 55 is positioned coaxially about the shaft 44 between the first retention member 52 and the second retention member 53, with the elastomeric plug member 55 having a first end portion 56 in contact with the first retention member 52, a second end portion 57 in contact with the second retention member 53, and an intermediate portion 58 connecting the first end portion 56 of the elastomeric plug member 55 to the second end portion 57 of the elastomeric plug member 55. As illustrated in FIG. 2, the axial extents of the first end portion 56, the intermediate portion 58J and the second end portion 57 are represented by the dimensions a, b, and c, respectively. The bore 60 through the elastomeric plug 55 can have a hexagonal cross-section corresponding in size and shape to the first end portion 45 of shaft 44 to maintain the desired orientation of the elastomeric plug 55.

The first retention member 52 has an inner annular chamber 61 and an outer annular chamber 62 formed therein coaxially with the shaft 44 and extending radially outwardly from the first end portion 45 of the shaft 44. The outer annular chamber 62 is positioned between and extends axially from the inner annular chamber 61 to the end of the first retention member 52 which faces toward the second end of shaft 44 and the intermediate portion of elastomeric plug 55. The inner annular chamber 61 has radial dimensions (measured from the longitudinal axis of the shaft 44) which are greater than the corresponding radial dimensions of the immediately adjacent portion of the outer annular chamber 62 so as to form an annular shoulder 63 at the junction of the inner annular chamber 61 and the outer annular chamber 62. The outer annular chamber 62 has a frustoconical surface which diverges outwardly from the longitudinal axis of the changer tool 20 in the direction facing the intermediate portion 58 of the elastomeric plug member 55, with the minimum diameter of the frustoconical surface being at the junction of the inner annular chamber 61 and the outer annular chamber 62.

The first end portion 56 of the elastomeric plug member 55 has a frustoconical surface which converges inwardly toward the longitudinal axis of the changer tool 20 at the distal end of the first end portion 56 so as to mate with the frustoconical surface of the outer annular chamber 62. The first end portion 56 of the elastomeric plug member 55, which extends axially through the outer annular chamber 62 into the inner annular chamber 61, also has a retention element 64 positioned in the inner annular chamber 61. The retention element 64 extends radially outwardly from the smaller end of the frustoconical surface of the first end portion 56 and has a maximum actual radial dimension (measured from the longitudinal axis of the shaft 44) which is greater than the minimum actual radial dimension (measured from the longitudinal axis of the shaft 44) of the shoulder 63 such that the retention element 64 engages the shoulder 63 so that the first end portion 56 of the elastomeric plug member 55 is secured to the retention member 52.

The second retention member 53 has an inner annular chamber 71 and an outer annular chamber 72 formed therein coaxially with the shaft 44 and extending radially outwardly from the shaft 44. The outer annular chamber 72 is positioned between and extends axially from the inner annular chamber 71 to the end of the second retention member 53 which faces toward the first end of shaft 44. The inner annular chamber 71 has radial dimensions (measured from the longitudinal axis of the shaft 44) which are greater than the corresponding radial dimensions of the immediately adjacent portion of the outer annular chamber 72 so as to form an annular shoulder 73 at the junction of the inner annular chamber 71 and the outer annular chamber 72. The outer annular chamber 72 has a frustoconical surface which diverges outwardly from the longitudinal axis of the changer tool 20 in the direction facing the intermediate portion 58 of the elastomeric plug member 55, with the minimum diameter of the frustoconical surface being at the junction of the inner annular chamber 71 and the outer annular chamber 72.

The second end portion 57 of the elastomeric plug member 55 has a frustoconical surface which converges inwardly toward the longitudinal axis of the changer tool 20 at the distal end of the second end portion 57 in the direction facing the retention member 53 so as to mate with the frustoconical surface of the outer annular chamber 72. The second end portion 57 of the elastomeric plug member 55, which extends axially through the outer annular chamber 72 into the inner annular chamber 71, also has a retention element 74 positioned in the inner annular chamber 71. The retention element 74 extends radially outwardly from the small end of the frustoconical surface of the second end portion 57 and has a maximum actual radial dimension (measured from the longitudinal axis of the shaft 44) which is greater than the minimum actual radial dimension (measured from the longitudinal axis of the shaft 44) of the shoulder 73 such that the retention element 74 engages the shoulder 73 so that the second end portion 57 of the elastomeric plug member 55 is secured to the retention member 53.

As shown in FIG. 3, the distal portion of each of the end portions 56, 57 has a generally circular cross-section in a plane perpendicular to the longitudinal axis of shaft 44, while the intermediate portion 58 of the elastomeric plug member 55 has a generally rectangular shape with the smaller dimension being equal to the maximum diameter of the end portions 56, 57. The exterior surface of each of the end portions 56, 57 merges smoothly from the frustoconical surface of the distal portion to the substantially rectangular cross-section of the intermediate portion 58 of the elastomeric plug 55. This facilitates the passage of the elastomeric plug member 55 through the generally rectangular port 23 of valve 11 while providing the maximum amount of elastomeric material in the intermediate portion 58 for a given length thereof.

In the illustrated embodiment of the invention, each of the retention elements 64, 74 is an annular ring which extends completely around the outer circumference of the smaller end of the frustoconical surface of the respective end portion of the elastomeric plug member 55, with the maximum actual radial dimension (measured from the longitudinal axis of the shaft 44) of each of the annular rings 64, 74 being at least substantially equal to the maximum actual radial dimension (measured from the longitudinal axis of the shaft 44) of the inner annular chamber of the respective retention member, to thereby form an O-ring type fluid seal between the respective retention member and the outer surface of the elastomeric plug member 55 so as to prevent leakage between the exterior surface of the elastomeric plug member 55 and the respective retention member.

The elastomeric plug member 55 is formed of suitable elastomeric materials, e.g. rubbers or other elastomeric polymers. Each of the first and second end portions 56, 57 of the elastomeric plug member 55 is formed of an elastomeric material which has a hardness which is substantially greater than the hardness of the elastomeric material of the intermediate portion 58. The elastomeric plug member 55 can be fabricated in any suitable manner. For example, a preform for the intermediate portion 58 can be formed of a relatively soft rubber, this preform can be placed in a mold which has spaces for the end portions, and then a harder rubber can be injected into these spaces to form an integral elastomeric member 55 having a relatively soft and readily flexible intermediate section 58 and two relatively hard and only mildly flexible end portions 56, 57. In general, the hardness of each of the end portions 56, 57 is greater than the hardness of the intermediate portion 58 by at least 20, preferably at least 25, and more preferably at least 30 units on the durometer Type A scale. Preferably, the hardness of each of the end portions 56, 57 of the elastomeric plug member 55 is in the range of about 60 durometer Type A to about 100 durometer Type A, while the hardness of the intermediate portion 58 of the elastomeric plug member 55 is in the range of about 25 durometer Type A to about 55 durometer Type A. More preferably, the hardness of each of the end portions 56, 57 of the elastomeric plug member 55 is in the range of about 70 durometer Type A to about 100 durometer Type A, while the hardness of the intermediate portion 58 of the elastomeric plug member 55 is in the range of about 30 durometer Type A to about 55 durometer Type A. A particularly useful elastomeric plug member 55 is one wherein the hardness of each of the end portions 56, 57 is in the range of about 75 durometer Type A to about 100 durometer Type A, while the hardness of the intermediate portion 58 is in the range of about 35 durometer Type A to about 55 durometer Type A.

As shown in FIG. 1, with the valve plug 22 in the fully closed position, the housing 31 of the changer tool 20 has been secured to fitting end portion 16 of valve body 12 by threaded engagement, axially compressing a frustoconical elastomeric seal member 81 in position about the exterior of housing 31 between the outer face of fitting end portion 16 and the frustoconical inner face of a Metal ring 82 which is positioned about housing 31 adjacent to a set of four radially extending handles 83, thereby forming a fluid seal between the valve body 12 and the exterior of the housing 31. The four radially extending handles 83 are welded to the exterior of housing 31 at 90° intervals to facilitate the manual connection of the changer tool 20 to the valve 11 without the necessity of employing a wrench. Similarly, the external threads on housing 31 can be undersized with respect to the internal threads on fitting end portion 16 of the valve body 12 in order to minimize friction during the manual connection of the housing 31 to the valve body 12. This can be done as the elastomeric seal member 81 provides the necessary seal.

Figure 4:
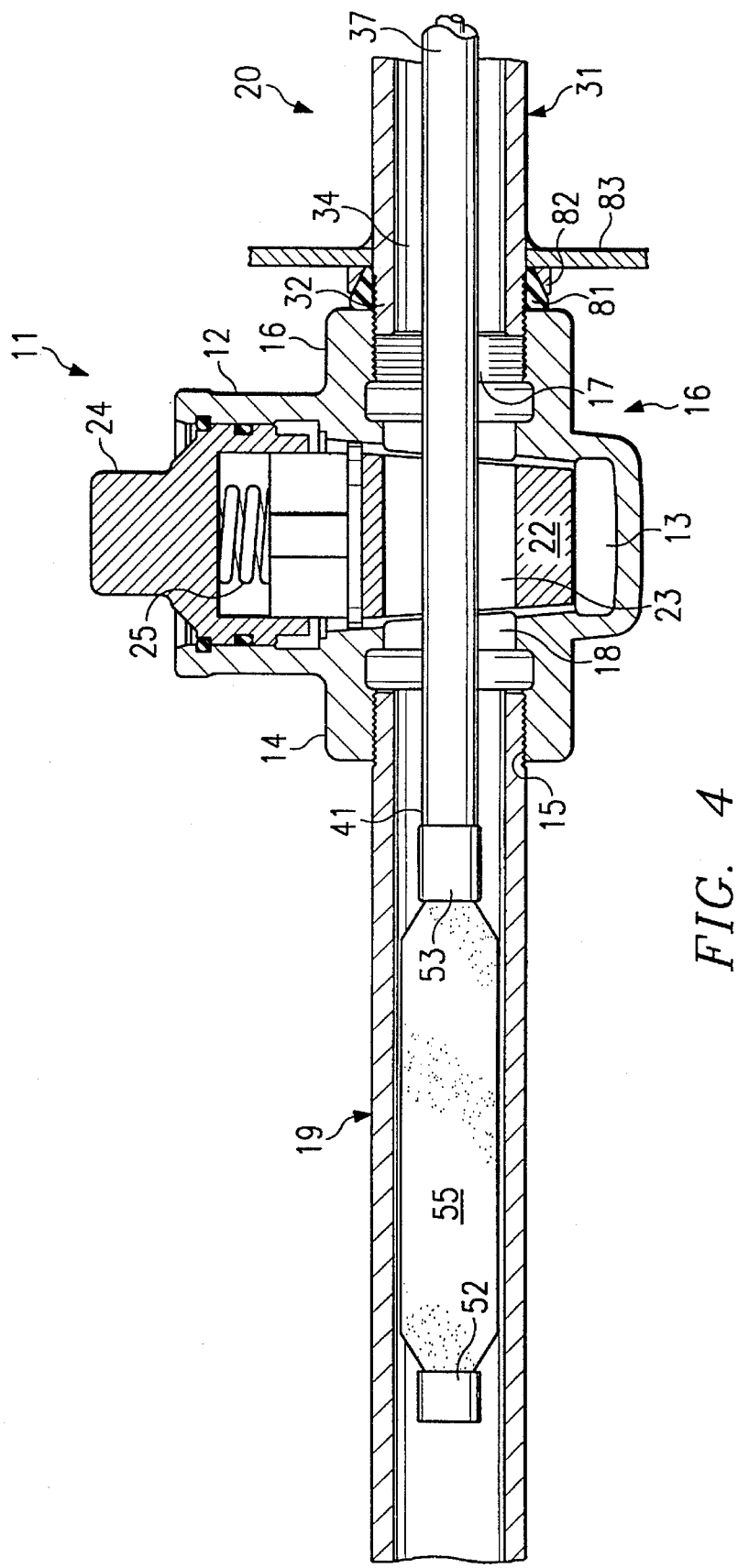
FIG. 4 is an elevational view, partly in cross-section, of the valve stop changer tool of FIG. 1 with the stop changer assembly having been inserted through the valve and into the upstream pipe.

Referring now to FIG. 4, the valve plug 22 has been rotated to the fully open position, providing a straight path from the first open end of housing 31 and outlet opening 17 through port 23 to the inlet opening 15 and the open end of pipe 19. The operating handle 49 has been utilized to axially push the elastomeric plug member 55 through the port 23 and into the pipe 19. Although the valve 11 is in its open position, the seal member 81 and the O-ring 39 prevent any leakage through the valve 11 and the valve stop changer tool 20. A longitudinal cross-section and a radial cross-section of the elastomeric plug member 55 in an uncompressed condition in pipe 19 are illustrated in FIGS. 5 and 6.

With the elastomeric plug member 55 positioned entirely within pipe 19, the operating handle 49 is rotated so as to rotate the nut 47 in the direction which causes the shaft 44 to move to the right (as viewed in FIG. 4) while the tubular housing 37 remains stationary, thereby decreasing the distance between retention element 52 and retention element 53 and axially compressing the elastomeric plug member 55. The resulting axial contraction of the elastomeric plug member 55 results in a radial expansion of both the intermediate portion 58 and the end portions 56, 57 to the configuration illustrated in FIGS. 7 and 8. The elasticity of the intermediate portion 58 permits the intermediate portion 58 to readily expand radially from the generally rectangular cross-sectional configuration of FIG. 3 to a circular cross-sectional configuration of sufficient diameter such that the exterior surface of a significant part of the intermediate portion 58 contacts the inner surface of pipe 19 completely around the inner circumference of pipe 19, thereby effectively plugging the pipe 19. The relative hardness of the end portions 56, 57 permits a small amount of increased radially outward flaring of the frustoconical surfaces of the retention elements 52 and 53 during the axial compression of the elastomeric plug member 55 as shown in FIG. 7, thereby increasing the effective diameter of each of the end portions 56, 57 so that the relatively stiff but somewhat flexible end portions 56, 57 serve to provide greater axial confinement of the intermediate portion 58 than would be provided by metal retainers having the shape of the uncompressed end portions 56, 57.

With the elastomeric plug member 55 closing off the pipe 19, the pressure in the housing 31 can be reduced to atmospheric pressure by opening a relief valve 85 mounted in the housing 31. The handle 49 can be removed from the changer tool 20, and then the depressurized housing 31 can be unscrewed from the valve 11 by effecting relative axial movement of the housing 31 with respect to the tubular member 37 without removing the plug member 55, shaft 44, and tubular member 37 from the pipe 19. The valve 11 can then be removed from its connection with pipe 19 so that the valve 11 can be repaired or a new valve 11 obtained.

The new or repaired valve 11, with the plug 22 in its open position, can be repositioned with the tubular member 37 extending through the opening 15, port 23, and opening 17. Then the repositioned valve 11 can be reconnected to the end of pipe 19. With the valve 11 connected to pipe 19, the housing 31 can be repositioned over the outer end of tubular member 37 and then reconnected to valve 11. The handle 49 can then be reattached, the relief valve 85 closed, and the nut 47 rotated in the direction which causes the shaft 44 to move axially to the left (as viewed in FIG. 4) while the tubular housing 37 remains stationary, thereby increasing the distance between retention element 52 and retention element 53 and eliminating the axial compression of the elastomeric plug member 55. The elimination of the axial compression of the elastomeric plug member 55 results in an axial expansion and radial contraction of both the intermediate portion 58 and the end portions 56, 57 to the configuration illustrated in FIGS. 5 and 6. The securement of the end portions 56, 57 of the elastomeric plug 55 in the retention members 52, 53 by the retention rings 64, 74, respectively, causes an immediate axial expansion of the elastomeric plug 55 corresponding to the increasing distance between retention members 52, 53. With the axial expansion of elastomeric plug 55, the elasticity of the intermediate portion 58 permits the intermediate portion 58 to readily contract radially from the generally circular cross-sectional configuration of FIGS. 7 and 8 to the generally rectangular cross-sectional configuration of FIG. 3, whereby the elastomeric plug member 55 can be readily withdrawn through the port 23 of valve 11.

As the grip of the elastomeric plug 55 against the pipe 19 is released, the positive pressure in the upstream portion 6f pipe 19 forces the tool assembly to the right (as viewed in FIG. 4). Once the retention member 52 has cleared the plug chamber 13 of valve 11, the plug 22 can be rotated to its closed position, illustrated in FIG. 1. The diameter of retention element 53 is greater than the diameter of bore 36 in order to prevent the elastomeric plug 55 impacting the flange 35. Thus, the flange 35 serves as a stop for the retention element 53, and the retention element 53 hitting the flange 35 informs the operator that the stop changer assembly is entirely within the housing 31. With the valve 11 in its closed position, the changer tool 20 can be removed by opening relief valve 85 and then unscrewing the housing 31 from the fitting end portion 16.

Reasonable variations and modifications are possible within the scope of the foregoing description, the drawings and the appended claims to the invention. For example, while the valve 11 has been illustrated as a plug valve with a frustoconical plug, the invention is also applicable to other valves having a substantially straight flow path therethrough, for example a plug valve with a cylindrical plug, a gate valve with a rising stem, a gate valve with a nonrising stem, a valve with a swing gate, etc. While the valve 11 has been illustrated with internally threaded openings for coupling to externally threaded portions of pressurized containers or pipes or tools, the valve 11 can be provided with external threads for coupling with internally threaded components, or other means of coupling can be employed, for example, bolting flanges, sweat fittings, compression fittings, etc. While the pressurized container to which the valve 11 is connected has been illustrated as a gas service pipe 19, the valve can be used with any other type of pipe or vessel having a fluid opening to which the valve can be connected, e.g. a relief valve on a tank where the portion of the vessel immediately upstream of the valve can be sealed by the expansion of the plug 55.

I claim:

1. A changer tool for removal of a fluid valve from connection with a fluid pressurized container, the fluid valve having a valve body forming a fluid inlet opening and a fluid outlet opening which are at least generally aligned with each other, the fluid pressurized container being connected to the valve body at a first one of the fluid inlet opening and the fluid outlet opening, said changer tool comprising:

an elongated housing having first and second end portions and a first bore extending axially therethrough, said first end portion of said housing being adapted for connection to the valve body at a second one of the fluid inlet opening and the fluid outlet opening;

a tubular member positioned within and coaxial with said first bore for slidable movement of the tubular member along the axis of said first bore, said tubular member having a first end and a second end and a second bore extending axially therethrough;

a shaft positioned within and coaxial with the second bore for axial movement of the shaft with respect to the tubular member, said shaft having a first end and a second end;

a first retention member on said first end of said shaft;

a second retention member on said first end of said tubular member, said second retention member being spaced a distance from said first retention member;

an elastomeric tubular plug member positioned about said shaft between said first retention member and said second retention member, said elastomeric plug member having a first axial extent in the form of a first end portion in contact with said first retention member, a second axial extent in the form of a second end portion in contact with said second retention member, and a third axial extent in the form of an intermediate portion positioned between and connecting said first end portion of said elastomeric plug member to said second end portion of said elastomeric plug member, wherein each of the first and second end portions of the elastomeric plug member has a hardness which is substantially greater than the hardness of said intermediate portion, whereby when said elastomeric plug member is inserted through said fluid inlet opening and said fluid outlet opening into said fluid pressurized container, axial movement of the shaft with respect to the tubular member in a first direction decreases the distance between said first and second retention members so as to axially compress said elastomeric plug member and thereby cause a radial expansion of each of said first end portion said second end portion and said intermediate portion of said elastomeric plug member so that said intermediate portion readily expands radially an amount sufficient to contact an inner surface of said fluid pressurized container completely around an inner circumference of said fluid pressurized container to thereby plug said fluid pressurized container and so that each of said first and second end portions of said elastomeric plug member flares outwardly a smaller amount to increase the axial confinement of said intermediate portion, and then axial movement of the shaft with respect to the tubular member in a second direction opposite said first direction, increases the distance between said first and second retention members to permit an axial expansion and radial contraction of said elastomeric plug member to thereby unplug said fluid pressurized container.

2. A changer tool in accordance with claim 1 wherein the first end portion of the elastomeric plug member is secured to the first retention member, and wherein the second end portion of the elastomeric plug member is secured to the second retention member, whereby said elastomeric plug member can be placed under tension when the distance between the first and second retention members is increased to eliminate the axial compression of the thus axially compressed elastomeric plug member, and thus cause an axial expansion and radial contraction of said elastomeric plug member to thereby unplug said fluid pressurized container.

3. A changer tool in accordance with claim 1 wherein the hardness of each of the first and second end portions of said elastomeric plug member is greater than the hardness of said intermediate portion of said elastomeric plug member by at least 20 on the durometer Type A scale.

4. A changer tool in accordance with claim 3 wherein the first end portion of the elastomeric plug member is secured to the first retention member, and wherein the second end portion of the elastomeric plug member is secured to the second retention member, whereby said elastomeric plug member can be placed under tension when the distance between the first and second retention members is increased to eliminate the axial compression of the thus axially compressed elastomeric plug member, and thus cause an axial expansion and radial contraction of said elastomeric plug member to thereby unplug said fluid pressurized container.

5. A changer tool in accordance with claim 4 wherein the hardness of each of the first and second end portions of said elastomeric plug member is greater than the hardness of said intermediate portion of said elastomeric plug member by at least 30 on the durometer Type A scale.

6. A changer tool in accordance with claim 4 wherein the hardness of each of the first and second end portions of said elastomeric plug member is in the range of about 60 durometer Type A to about 100 durometer Type A, while the hardness of said intermediate portion of said elastomeric plug member is in the range of about 25 durometer Type A to about 55 durometer Type A.

7. A changer tool in accordance with claim 1 wherein the hardness of each of the first and second end portions of said elastomeric plug member is in the range of about 70 durometer Type A to about 100 durometer Type A, while the hardness of said intermediate portion of said elastomeric plug member is in the range of about 30 durometer Type A to about 55 durometer Type A.

8. A changer tool in accordance with claim 1 wherein the hardness of each of the first and second end portions of said elastomeric plug member is in the range of about 75 durometer Type A to about 100 durometer Type A, while the hardness of said intermediate portion of said elastomeric plug member is in the range of about 35 durometer Type A to about 55 durometer Type A.

9. A changer tool for removal of a fluid valve from a fluid pressurized container, the fluid valve having a valve body forming a fluid inlet opening and a fluid outlet opening which are at least generally aligned with each other, the fluid pressurized container being connected to the valve body at a first one of the fluid inlet opening and the fluid outlet opening, said changer tool comprising:

- a tubular housing having first and second end portions and a first bore extending axially therethrough, said first end portion of said housing being adapted for connection to the valve body at a second one of the fluid inlet opening and the fluid outlet opening:
- a tubular member positioned within and coaxial with said first bore for slidable movement of the tubular member along the axis of said first bore, said tubular member having a first end and a second end and a second bore extending axially therethrough;
- a shaft positioned within and coaxial with the second bore for axial movement of the shaft with respect to the tubular member, said shaft having a first end and a second end;
- a first retention member on said first end of said shaft;
- a second retention member on said first end of said tubular member, said second retention member being spaced a distance from said first retention member;
- wherein said first retention member has inner and outer annular chambers formed therein coaxially with said shaft and extending radially outwardly from said shaft, said outer annular chamber being positioned between and extending axially from said inner annular chamber to an end of said first retention member facing toward said second end of said shaft, said inner annular chamber having radial dimensions (measured from the longitudinal axis of said shaft) which are greater than the corresponding radial dimensions of the immediately adjacent portion of the outer annular chamber so as to form a first annular shoulder at the junction of the inner and outer annular chambers of the first retention member;
- wherein said second retention member has inner and outer annular chambers formed therein coaxially with said shaft and extending radially outwardly from said shaft, the outer annular chamber of said second retention member being positioned between and extending axially from the inner annular chamber of said second retention member to an end of said second retention member facing toward said first end of said shaft, the inner annular chamber of said second retention member having radial dimensions (measured from the longitudinal axis of said shaft) which are greater than the corresponding radial dimensions of an immediately adjacent portion of the outer annular chamber of the second retention member so as to form a second annular shoulder at the junction of the inner and outer annular chambers of the second retention member; and
- an elastomeric tubular plug member positioned about said shaft between said first retention member and said second retention member, said elastomeric plug member having a first end portion in contact with and secured to said first retention member, a second end portion in contact with and secured to said second retention member, and an intermediate portion connecting said first end portion of said elastomeric plug member to said second end portion of said elastomeric plug member;
- wherein said first end portion of said elastomeric plug member extends axially through the outer annular chamber of the first retention member into the inner annular chamber of the first retention member and has a first radially outwardly extending retention element positioned in the inner annular chamber of the first retention member with a maximum actual radial dimension (measured from the longitudinal axis of said shaft) of said first retention element being greater than a minimum actual radial dimension (measured from the longitudinal axis of said shaft) of the first annular shoulder such that the first end portion of said elastomeric plug member is secured to said first retention member; and
- wherein said second end portion of said elastomeric plug member extends axially through the outer annular chamber of the second retention member into the inner annular chamber of the second retention member and has a second radially outwardly extending retention element positioned in the inner annular chamber of the second retention member with the maximum actual radial dimension (measured from the longitudinal axis of said shaft) of said second retention element being greater than a minimum actual radial dimension (measured from the longitudinal axis of said shaft) of the second annular shoulder such that the second end portion of said elastomeric plug member is secured to said second retention member;
- whereby when said elastomeric plug member is inserted through said fluid inlet opening and said fluid outlet opening into said fluid pressurized container, axial movement of the shaft with respect to the tubular member in a first direction decreases the distance between said first and second retention members so as to axially compress said elastomeric Plug member and thereby cause a radial expansion of said elastomeric plug member to thereby plug said fluid pressurized container, and then axial movement of the shaft with respect to the tubular member in a second direction, opposite said first direction, increases the distance between said first and second retention members so that the thus axially compressed elastomeric plug member can be placed under tension to eliminate the axial compression of said thus axially compressed elastomeric plug member and thus cause an axial expansion and radial contraction of said elastomeric plug member to thereby unplug said fluid pressurized container.

10. A changer tool in accordance with claim 9, wherein each of said first and second retention elements is an annular ring which extends completely around the outer circumference of the respective end portion of said elastomeric plug member.

11. A changer tool in accordance with claim 10, wherein the maximum actual radial dimension (measured from the longitudinal axis of said shaft) of each of the annular rings is at least substantially equal to the maximum actual radial dimension (measured from the longitudinal axis of said shaft) of the inner annular chamber of the respective retention member.

12. A changer tool in accordance with claim 9, wherein each of the first and second end portions of said elastomeric plug member forms a gas seal between said elastomeric plug member and the associated retention member so as to prevent gas leakage through said tubular member.

13. A changer tool in accordance with claim 9, wherein the outer annular chamber of each of said first and second retention members has a frustoconical configuration diverging outwardly from a minimum diameter at the junction of the inner and outer annular chambers of the respective retention member, and wherein each of the end portions of said elastomeric plug member has a frustoconical configuration converging toward the respective end of the elastomeric plug member to provide a frustoconical surface on the respective end portion of the elastomeric plug member which mates with a frustoconical surface of the outer annular chamber of the respective retention member.

14. A changer tool in accordance with claim 9 wherein each of the first and second end portions of the elastomeric plug member has a hardness which is substantially greater than the hardness of said intermediate portion.

15. A changer tool in accordance with claim 9 wherein the hardness of each of the first and second end portions of said elastomeric plug member is greater than the hardness of said intermediate portion of said elastomeric plug member by at least 20 on the durometer Type A scale.

16. A changer tool in accordance with claim 15 wherein the hardness of each of the first and second end portions of said elastomeric plug member is in the range of about 60 durometer Type A to about 100 durometer Type A, while the hardness of said intermediate portion of said elastomeric plug member is in the range of about 25 durometer Type A to about 55 durometer Type A.

17. A changer tool in accordance with claim 9 wherein the hardness of each of the first and second end portions of said elastomeric plug member is in the range of about 60 durometer Type A to about 100 durometer Type A, while the hardness of said intermediate portion of said elastomeric plug member is in the range of about 25 durometer Type A to about 55 durometer Type A.

18. A changer tool in accordance with claim 9 wherein the hardness of each of the first and second end portions of said elastomeric plug member is in the range of about 70 durometer Type A to about 100 durometer Type A, while the hardness of said intermediate portion of said elastomeric plug member is in the range of about 30 durometer Type A to about 55 durometer Type A.

19. A changer tool in accordance with claim 9 wherein the hardness of each of the first and second end portions of said elastomeric plug member is in the range of about 75 durometer Type A to about 100 durometer Type A, while the hardness of said intermediate portion of said elastomeric plug member is in the range of about 35 durometer Type A to about 55 durometer Type A.

* * * * *